United States Patent
Inagi et al.

(10) Patent No.: US 7,551,601 B2
(45) Date of Patent: Jun. 23, 2009

(54) WIRELESS NETWORK SERVICE PROVISION METHOD AND WIRELESS NETWORK SYSTEM

(75) Inventors: Bunichi Inagi, Kanagawa (JP); Yoshikazu Kobayashi, Kanagawa (JP)

(73) Assignee: NEC Infrontia Corporation, Kanagawa (JP)

(*) Notice: Subject to any disclaimer, the term of this patent is extended or adjusted under 35 U.S.C. 154(b) by 893 days.

(21) Appl. No.: 10/724,820

(22) Filed: Dec. 2, 2003

(65) Prior Publication Data
US 2004/0109462 A1 Jun. 10, 2004

(30) Foreign Application Priority Data
Dec. 2, 2002 (JP) ............... 2002-349445

(51) Int. Cl.
*H04L 12/66* (2006.01)
(52) U.S. Cl. .................. 370/352; 370/338; 370/349
(58) Field of Classification Search ............ 370/338, 370/401, 389, 349, 466, 469, 392
See application file for complete search history.

(56) References Cited

U.S. PATENT DOCUMENTS 7,139,270 B1 * 11/2006 Fatehi et al. ............... 370/392
2002/0191572 A1 * 12/2002 Weinstein et al. ........... 370/338
2007/0192870 A1 * 8/2007 Lynn et al. ................... 726/26

FOREIGN PATENT DOCUMENTS

| EP | 1 035 684 A2 | 9/2000 |
|---|---|---|
| JP | 09-139735 | 5/1997 |
| JP | 10-173665 A | 6/1998 |
| JP | 10-173692 A | 6/1998 |
| JP | 11-163849 | 6/1999 |
| JP | 200-31980 A | 1/2000 |
| JP | 2000-261427 A | 9/2000 |
| JP | 2001-345795 A | 12/2001 |

* cited by examiner

*Primary Examiner*—Curtis Kuntz
*Assistant Examiner*—Karen L Le
(74) *Attorney, Agent, or Firm*—Foley & Lardner LLP

(57) ABSTRACT

In a wireless network service provision method of providing communication services including internet connection by permitting access to a predetermined access point in a limitative area via wireless LAN or like local wireless interface, when a user subscribed to the communication service system accesses the pertinent access point, payload processing is executed in unique processing method to each user, and each user is discriminated according to data of the processed parts.

2 Claims, 1 Drawing Sheet

WIRELESS NETWORK SERVICE PROVISION METHOD AND WIRELESS NETWORK SYSTEM

BACKGROUND OF THE INVENTION

This application claims benefit of Japanese Patent Application No. 2002-349445 filed on Dec. 2, 2002, the contents of which are incorporated by the reference.

The present invention relates to a wireless network service provision method and a wireless network system, which are adapted to provide communication services including internet connection by permitting access to a predetermined access point in a limitative area via a local interface such as wireless LAN, for instance a hot spot.

So-called "hot spot service" is in practical use, which provides internet connection or contents services in particular places such as airports, hotels, coffee shops and fast-food shops. This is the provision of such services as internet connection as services with respect to a very limitative area by wireless techniques called local wireless interface such as wireless LAN and Bluetooth.

In such a hot spot, when performing communication via a local wireless service such as wireless LAN, a WEP key like those of neighbor users is usually used, thus readily making possible the wiretapping.

In the wireless communication in a closed environment such as home wireless LAN and enterprise wireless LAN, a method of providing a wireless communication device and a wireless communication method which can prohibit wiretapping and also a method of ciphering in order to prevent wiretapping from a wireless section with a wireless LAN system have heretofore been proposed, for instance, Japanese patent laid-open 2001-345795 and 2000-31980.

Furthermore, it has been proposed to build a virtual wireless LAN system, in which means for managing the attributes of LAN terminals is provided in a home network side managing server, means for determining the attributes of the LAN terminals and means for determining the attributes of the IAN terminals on the basis of the determined results are provided in a remote network side movement destination server, and it is thus made possible to discriminate packets sent out from a virtual wireless LAN terminal to a wireless base station (Japanese patent laid-open Hei 10-173665, for instance).

Further, it has been proposed to realize a LAN system, on which packet data are ciphered by using scramble patterns each peculiar for each of a plurality of broadcast domain and sent out to each terminal. Each terminal deciphers the ciphered data by using a scramble pattern provided to the own broadcast domain, thus preventing production of a correct replica of a different broadcast domain packet data, if received, to eliminate the possibility of data leaks and permitting data exchanges between terminals belonging to each of a plurality of broadcast domains (see Japanese patent laid-open Hei 10-173692, for instance).

However, any of the above prior art proposals, although being excellent in view of perfectly eliminating the possibility of data leaks, are complicated and large in scale too much to be applied to recently spreading hot spot services or the like.

SUMMARY OF THE INVENTION

An object of the present invention, therefore, is to provide a wireless network service provision method and a wireless network system, which, like the hot spot services, is fitted to communication services including internet connection in a limitative area, and in which the possibility of wiretapping is eliminated with a simple means.

According to an aspect of the present invention, there is provided a wireless network service provision method of providing communication services including internet connection by permitting access to a predetermined access point in a limitative area via wireless LAN or like local wireless interface, wherein, when a user subscribed to the communication service system accesses the pertinent access point, payload processing is executed in unique processing method to each user, and each user is discriminated based on data of the processed parts.

A plurality of payload processing methods capable of being used in the limitative area are prepared, and a processing method peculiar to each user is selectively adopted. One of a plurality of preliminarily prepared processing methods is randomly selected for the payload processing. The communication services are provided via a VLAN, to which a plurality of sub-networks are connected via a communication line. The communication services are provided in an area, which covers hot spot communication services of providing internet connection and contents services in a predetermined place. The communication services are provided by using data communication based on portal switch VLAN.

According to another aspect of the present invention, there is provided a wireless network system for providing communication services including internet connection by permitting access to a predetermined access point in a limitative area via wireless LAN or like local wireless interface, wherein, when a user subscribed to the communication service system accesses the pertinent access point, payload processing is executed in unique processing method to each user, and each user is discriminated based on data of the processed parts.

A plurality of payload processing methods capable of being used in the limitative area are prepared, and a processing method peculiar to each user is selectively adopted. One of a plurality of preliminarily prepared processing methods is randomly selected for the payload processing. The communication services are provided via a VLAN, to which a plurality of sub-networks are connected via a communication line. The communication services are provided in an area, which covers hot spot communication services of providing internet connection and contents services in a predetermined place. The communication services are provided by using data communication based on portal switch VLAN.

Other objects and features will be clarified from the following description with reference to attached drawings.

PREFERRED EMBODIMENTS OF THE INVENTION

Figure 1:
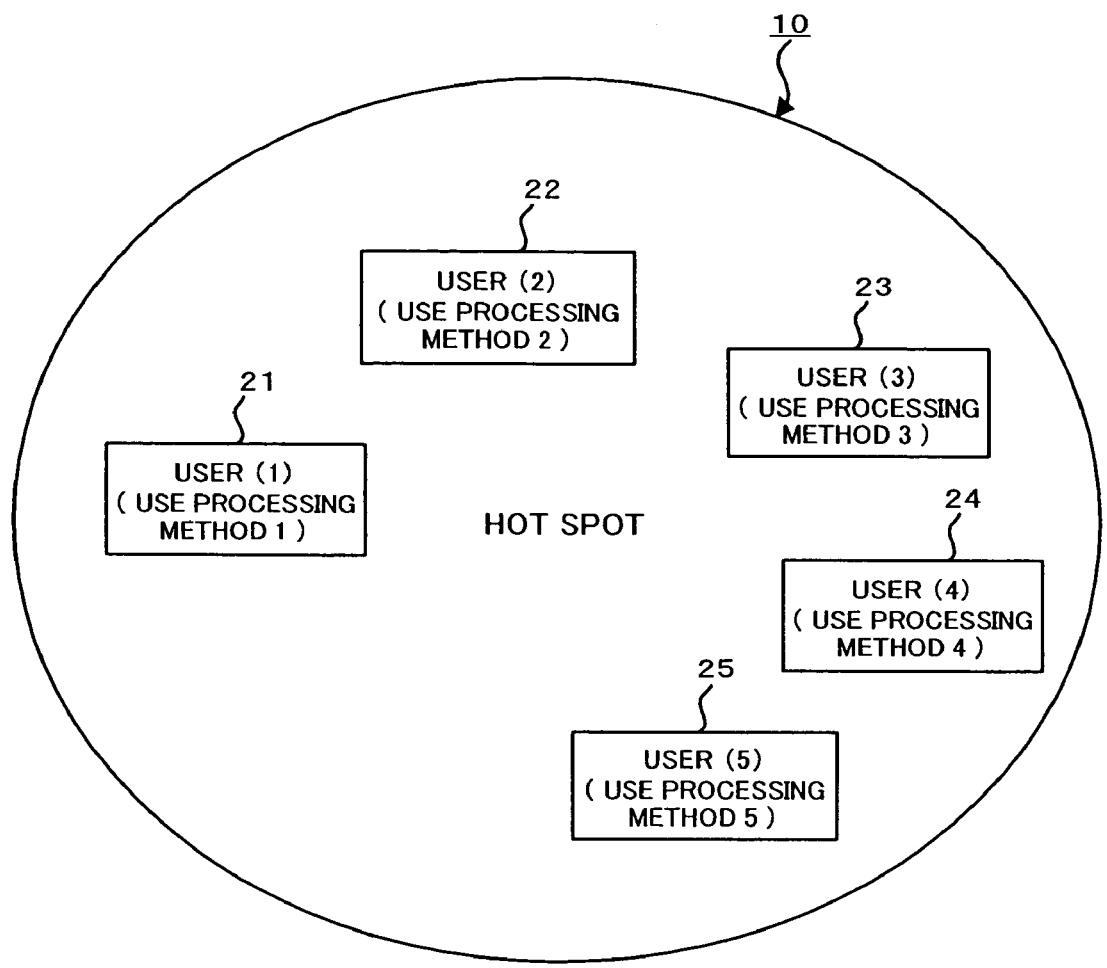
FIG. 1 shows a schematic view for describing a wireless network service provision method and a wireless network system.

Preferred embodiments of the present invention will now be described with reference to the drawings.

FIG. 1 illustrates a schematic view for describing a wireless network service provision method and a wireless network system.

The wireless network system for carrying out the wireless network service provision method according to the present invention, constitutes a hot spot 10, which provides communication services including internet connections by making it possible to access a predetermined access point in a limited area via a local wireless interface such as wireless LAN.

Specifically, the hot spot 10 provides communication services such as internet connection and contents services in limited places such as airports, hotels, coffee shops and fast-food shops by wireless techniques called local wireless interface such as wireless LAN or Bluetooth.

In the hot spot 10, a plurality of users 21, 22, subscribed to communication service are provided such that they access predetermined access points (not shown).

In the system according to the present invention, when the users 21, 22, . . . access a pertinent access point, a payload process is executed by a process method each peculiar to each user, and each user is discriminated based on data of the processed part.

As for the payload process method of the users 21, 22, . . . a method is applicable that a plurality of payload process methods used in the hot spot 10 in one area are preliminarily prepared, and that a process method peculiar to each user is applicable.

As for application of the payload processing methods each peculiar to each user, one of a plurality of preliminarily prepared processing methods is randomly selected for the payload processing.

In the hot spot 10, communication services can be provided via a VLAN (virtual LAN), to which a plurality of sub-networks are connected via a communication line. The VLAN is a theoretical (or virtual) LAN system, in which a plurality of sub-networks are interconnected via a communication line. In this embodiment, a virtual wireless LAN system using a wireless system is constructed as the access system of each terminal (or user).

With the above embodiment, each user has a payload of a different form, and it is possible to prevent intrusion or wiretapping of other users than the pertinent user in communication in the same hot spot.

In effect, the present invention is not only applicable to the so-called hot spot, but is also widely applicable wireless network systems adapted to provide communication services including internet connection by permitting access to a predetermined access point in a limitative area via wireless LAN or like local wireless interface.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

As described above, according to the present invention, it is possible to realize a wireless network service provision method and a wireless network system which is fitted to communication services including internet connection in a limitative area without the possibility of wiretapping.

What is claimed is:

1. A wireless network service provision method of providing communication services including internet connection by permitting access to a predetermined access point in a limitative area via wireless LAN or local wireless interface, the method comprising:
    accessing, by a new user subscribed to the communication service system, the predetermined access point;
    assigning one of a plurality of data processing methods to the new user, the one of the plurality of data processing methods being different from other ones of the data processing methods that have been respectively assigned to other users currently accessing the predetermined access point,
    wherein none of the users currently accessing the predetermined access point is capable of intercepting data being uploaded by or downloaded to the new user, due to differences in payload processing with respect to the plurality of data processing methods assigned to each of the users.

2. The wireless network service provision method according to claim 1, wherein the assigning step comprises:
    determining which ones of the plurality of data processing methods are currently not assigned to any of the users and are thus available for assignment to the new user, as available data processing methods; and
    randomly assigning one of the available data processing methods to the new user.

* * * * *